United States Patent
Reybrouck

(10) Patent No.: US 9,481,221 B2
(45) Date of Patent: Nov. 1, 2016

(54) PASSIVE AND ACTIVE SUSPENSION WITH OPTIMIZATION OF ENERGY USAGE

(71) Applicant: Tenneco Automotive Operating Company Inc., Lake Forest, IL (US)

(72) Inventor: Koenraad Reybrouck, Etterbeek (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 834 days.

(21) Appl. No.: 13/736,269

(22) Filed: Jan. 8, 2013

(65) Prior Publication Data

US 2014/0190156 A1    Jul. 10, 2014

(51) Int. Cl.
| | | |
|---|---|---|
| *B60G 11/26* | (2006.01) | |
| *B60G 15/08* | (2006.01) | |
| *F16F 9/34* | (2006.01) | |
| *B60G 13/14* | (2006.01) | |
| *B60G 17/044* | (2006.01) | |

(52) U.S. Cl.
CPC ............. *B60G 15/08* (2013.01); *B60G 13/14* (2013.01); *B60G 17/044* (2013.01); *F16F 9/34* (2013.01); *B60G 2202/413* (2013.01); *B60G 2202/415* (2013.01); *B60G 2202/416* (2013.01); *B60G 2300/60* (2013.01); *B60G 2500/02* (2013.01); *B60G 2600/182* (2013.01); *B60G 2600/184* (2013.01)

(58) Field of Classification Search
CPC .... B60G 17/08; B60G 17/027; B60G 17/04; B60G 17/0408; B60G 17/0416; B60G 17/0424; B60G 17/0432; B60G 17/044; B60G 17/048; B60G 17/0485; B60G 17/052
See application file for complete search history.

(56) References Cited

U.S. PATENT DOCUMENTS

| | | |
|---|---|---|
| 3,559,027 A | 1/1971 | Arsem |
| 3,861,487 A | 1/1975 | Gill |
| 3,893,702 A | 7/1975 | Keijzer et al. |
| 3,917,309 A | 11/1975 | Hegel et al. |
| 3,921,746 A | 11/1975 | Lewus |
| 3,954,256 A | 5/1976 | Keijzer et al. |
| 3,979,134 A | 9/1976 | Keijzer et al. |

(Continued)

FOREIGN PATENT DOCUMENTS

| | | |
|---|---|---|
| DE | 101 64 635 | 1/2003 |
| DE | 10 2006 058 671 | 3/2008 |

(Continued)

OTHER PUBLICATIONS

DE102010007237 Machine Translation, espacenet.*

(Continued)

*Primary Examiner* — Michael Leslie
*Assistant Examiner* — Dustin T Nguyen
(74) *Attorney, Agent, or Firm* — Harness, Dickey & Pierce, P.L.C.

(57) ABSTRACT

A hydraulic actuator includes a shock absorber and a control system that is separate from the shock absorber and which generates damping loads for the hydraulic actuator. The control system generates the damping load by using a pair of variable valves, a pair of check valves, an accumulator, a pump/motor and a flow controller. The forces are generated in all four quadrants of compression/rebound and active/passive. A device which recuperates the energy generated by the hydraulic actuator can be incorporated into the hydraulic actuator to generate energy in the form of electrical energy.

12 Claims, 6 Drawing Sheets

(56) References Cited

U.S. PATENT DOCUMENTS

| | | |
|---|---|---|
| 4,381,041 A | 4/1983 | Butoi |
| 4,743,046 A | 5/1988 | Schnittger |
| 5,097,419 A | 3/1992 | Lizell |
| 5,215,327 A | 6/1993 | Gatter et al. |
| 5,222,759 A * | 6/1993 | Wanner ............... B60G 17/04 280/124.158 |
| 5,231,583 A | 7/1993 | Lizell |
| 5,269,556 A | 12/1993 | Heyring |
| 5,398,788 A | 3/1995 | Lizell |
| 5,447,332 A | 9/1995 | Heyring et al. |
| 5,480,188 A | 1/1996 | Heyring et al. |
| 5,556,115 A | 9/1996 | Heyring |
| 5,562,305 A | 10/1996 | Heyring et al. |
| 5,601,306 A | 2/1997 | Heyring et al. |
| 5,601,307 A | 2/1997 | Heyring et al. |
| 5,682,980 A | 11/1997 | Reybrouck |
| 5,725,239 A | 3/1998 | de Molina |
| 5,785,344 A | 7/1998 | Vandewal et al. |
| 5,839,741 A | 11/1998 | Heyring |
| 5,915,701 A | 6/1999 | Heyring |
| 5,934,422 A | 8/1999 | Steed |
| 6,010,139 A | 1/2000 | Heyring et al. |
| 6,111,375 A | 8/2000 | Zenobi |
| 6,217,047 B1 | 4/2001 | Heyring et al. |
| 6,270,098 B1 | 8/2001 | Heyring et al. |
| 6,338,014 B2 | 1/2002 | Heyring et al. |
| 6,519,517 B1 | 2/2003 | Heyring et al. |
| 6,588,777 B1 | 7/2003 | Heyring |
| 6,669,208 B1 | 12/2003 | Monk et al. |
| 6,761,371 B1 | 7/2004 | Heyring et al. |
| 7,040,631 B2 | 5/2006 | Kotulla et al. |
| 7,321,816 B2 | 1/2008 | Lauwerys et al. |
| 7,350,793 B2 | 4/2008 | Munday |
| 7,384,054 B2 | 6/2008 | Heyring et al. |
| 7,386,378 B2 | 6/2008 | Lauwerys et al. |
| 7,637,513 B2 | 12/2009 | Kotulla et al. |
| 7,686,309 B2 | 3/2010 | Munday et al. |
| 7,751,959 B2 | 7/2010 | Boon et al. |
| 7,789,398 B2 | 9/2010 | Munday et al. |
| 8,672,337 B2 | 3/2014 | van der Knaap et al. |
| 8,820,064 B2 | 9/2014 | Six et al. |
| 8,966,889 B2 * | 3/2015 | Six ................. F15B 1/021 60/413 |
| 9,108,484 B2 | 8/2015 | Reybrouck |
| 2005/0252699 A1 | 11/2005 | Schedgick et al. |
| 2007/0089924 A1 * | 4/2007 | de la Torre ............. B60G 13/14 180/305 |
| 2008/0257626 A1 | 10/2008 | Carabelli et al. |
| 2009/0166989 A1 | 7/2009 | Atsushi |
| 2009/0192674 A1 | 7/2009 | Simons |
| 2009/0260935 A1 | 10/2009 | Avadhany et al. |
| 2010/0006362 A1 | 1/2010 | Armstrong |
| 2010/0072760 A1 | 3/2010 | Anderson et al. |
| 2011/0074123 A1 | 3/2011 | Fought et al. |
| 2011/0187065 A1 * | 8/2011 | Van Der Knaap . B60G 17/0152 280/5.507 |
| 2011/0302914 A1 | 12/2011 | Helbling |
| 2012/0049470 A1 | 3/2012 | Rositch et al. |
| 2014/0190156 A1 | 7/2014 | Reybrouck |
| 2015/0152888 A1 | 6/2015 | Six |

FOREIGN PATENT DOCUMENTS

| | | | |
|---|---|---|---|
| DE | 102010007237 | * 9/2010 | ........... B60G 17/027 |
| DE | 102010007237 A1 | 9/2010 | |
| EP | 1 878 598 | 1/2008 | |
| KR | 20010011034 A | 2/2001 | |
| KR | 1020090059260 A | 6/2009 | |
| WO | 2004/030955 | 4/2004 | |
| WO | 2008/005667 | 1/2008 | |
| WO | WO 2012173687 | 12/2012 | |

OTHER PUBLICATIONS

Search Report and Written Opinion from corresponding PCT Application No. PCT/US2013/078415 dated Apr. 23, 2014 (11 pages).

* cited by examiner

PASSIVE AND ACTIVE SUSPENSION WITH OPTIMIZATION OF ENERGY USAGE

FIELD

The present disclosure is directed to semi-active and active suspension systems. More particularly, the present disclosure is directed to semi-active and active suspension systems that recuperate the energy generated during the damping of the suspension system.

BACKGROUND

This section provides background information related to the present disclosure which is not necessarily prior art.

Suspension systems are provided to filter or isolate the vehicle's body (sprung portion) from the vehicle's wheels and axles (unsprung portion) when the vehicle travels over vertical road surface irregularities as well as to control body and wheel motion. In addition, suspension systems are also used to maintain an average vehicle attitude to promote improved stability of the vehicle during maneuvering. The typical passive suspension system includes a spring and a damping device in parallel with the spring which are located between the sprung portion and the unsprung portion of the vehicle.

Hydraulic actuators, such as shock absorbers and/or struts, are used in conjunction with conventional passive suspension systems to absorb unwanted vibration which occurs during driving. To absorb this unwanted vibration, hydraulic actuators include a piston located within a pressure cylinder of the hydraulic actuator. The piston is connected to the sprung portion or body of the vehicle through a piston rod. Because the piston is able to restrict the flow of damping fluid within the working chamber of the hydraulic actuator when the piston is displaced within the pressure cylinder, the hydraulic actuator is able to produce a damping force which counteracts the vibration of the suspension. The greater the degree to which the damping fluid within the working chamber is restricted by the piston, the greater the damping forces which are generated by the hydraulic actuator.

In recent years, substantial interest has grown in automotive vehicle suspension systems which can offer improved comfort and road handling over the conventional passive suspension systems. In general, such improvements are achieved by utilization of an "intelligent" suspension system capable of electronically controlling the suspension forces generated by hydraulic actuators.

Different levels in achieving the ideal "intelligent" suspension system called a semi-active or a fully active suspension system are possible. Some systems control and generate damping forces based upon the dynamic forces acting against the movement of the piston. Other systems control and generate damping forces based on the static or slowly changing dynamic forces, acting on the piston independent of the velocity of the piston in the pressure tube. Other, more elaborate systems, can generate variable damping forces during rebound and compression movements of the hydraulic actuator regardless of the position and movement of the piston in the pressure tube.

The movement produced in the hydraulic actuators in both the passive, semi-active and active suspension systems generates energy and this energy is dissipated into heat of the hydraulic actuator's fluid and the components of the actuator.

SUMMARY

This section provides a general summary of the disclosure, and is not a comprehensive disclosure of its full scope or all of its features.

The present disclosure provides the art with a system which captures the energy generated in a passive, semi-active or active suspension system in a way that the energy can be reused later or the energy can be converted into another form of energy such as electrical energy.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
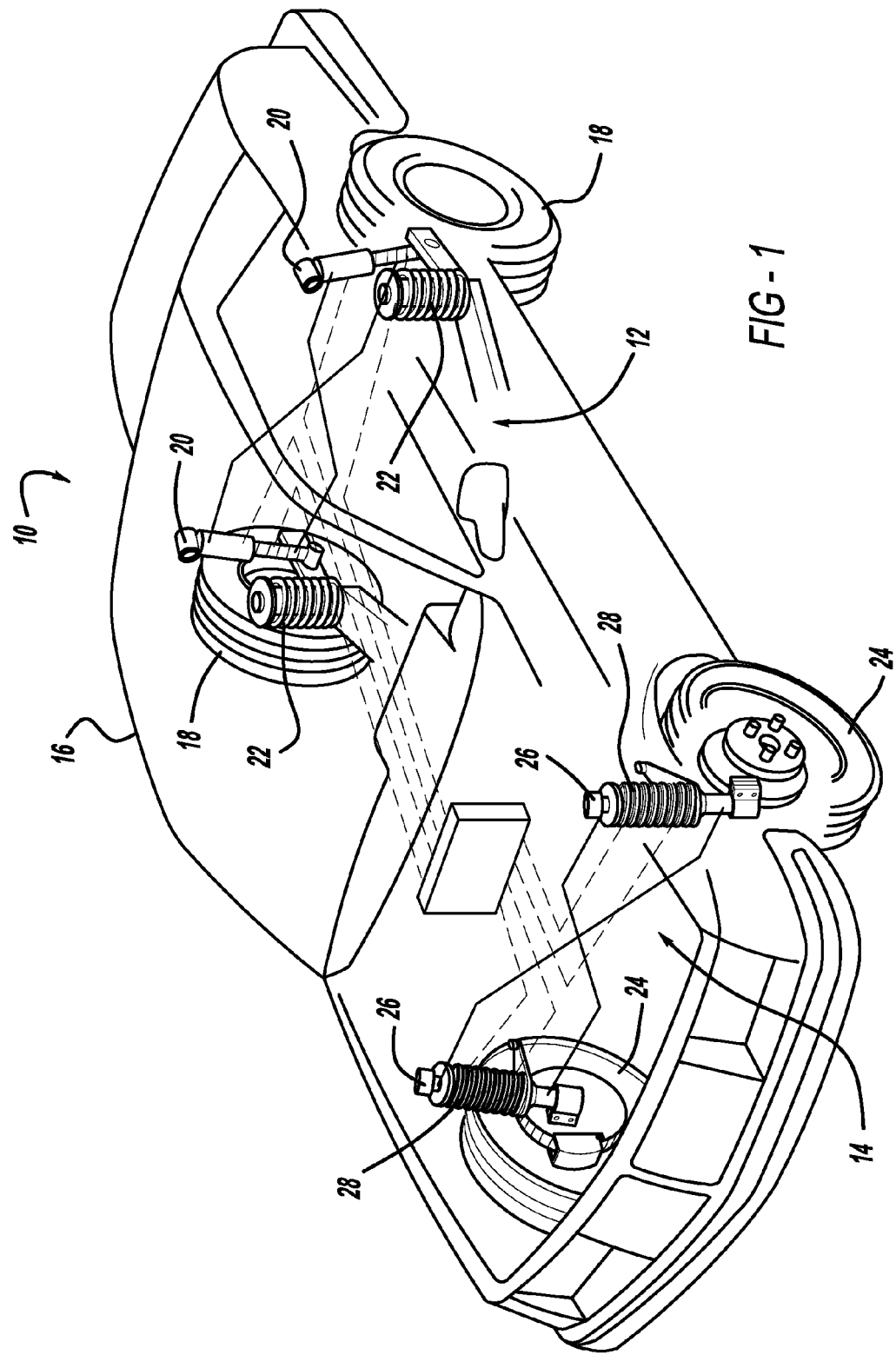
FIG. 1 is a diagrammatic illustration of a vehicle incorporating the energy harvesting suspension system in accordance with the present disclosure.

The following description is merely exemplary in nature and is not intended to limit the present disclosure, application, or uses. There is shown in FIG. 1, a vehicle incorporating a suspension system in accordance with the present disclosure and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of hydraulic actuators 20 and by a pair of springs 22. Similarly, front suspension 14 includes a transversely extending front axle assembly (not shown) to operatively support a pair of front wheels 24. The front axle assembly is attached to body 16 by means of a pair of hydraulic actuators 26 and by a pair of springs 28. Hydraulic actuators 20 and 26 serve to dampen the relative motion of the unsprung portion (i.e., front and rear suspensions 12, 14) with respect to the sprung portion (i.e., body 16) of vehicle 10. Sensors (not shown), at each wheel 18 and each wheel 24, sense the position and/or the velocity and/or the acceleration of body 16 in relation to rear suspension 12 and front suspension 14. While vehicle 10 has been depicted as a passenger car having front and rear axle assemblies, hydraulic actuators 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "hydraulic damper" as used herein is meant to refer to shock absorbers and hydraulic dampers in general and thus will include McPherson struts and other hydraulic damper designs known in the art.

Figure 2:
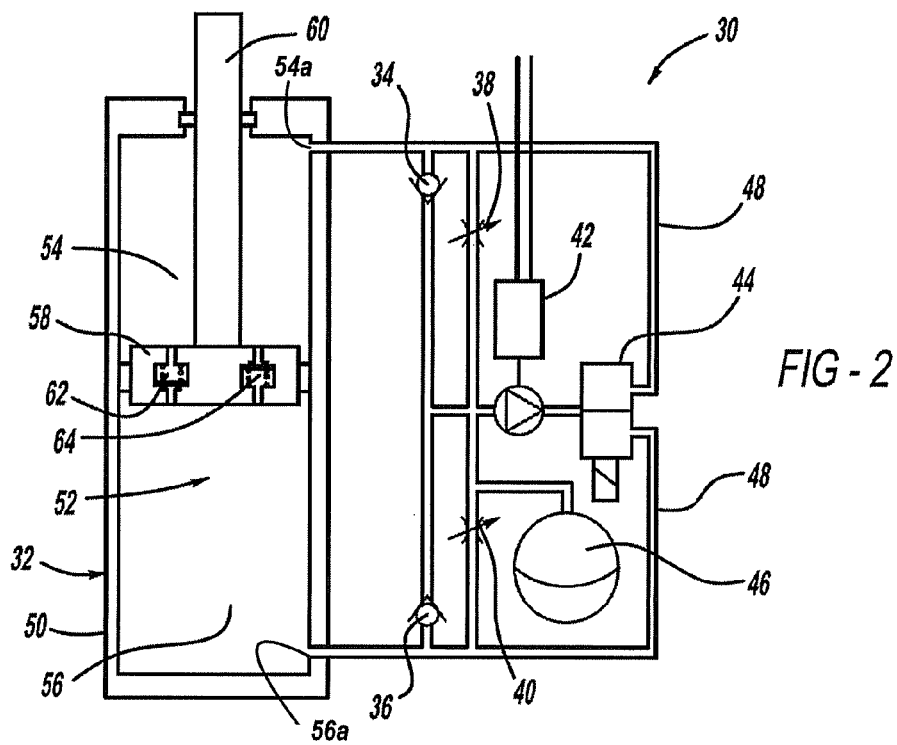
FIG. 2 is a schematic view of the hydraulic actuator illustrated in FIG. 1 illustrating the components of the hydraulic actuator.

Referring to FIG. 2, one of hydraulic actuators 20 is illustrated schematically. While FIG. 2 only illustrates hydraulic actuator 20, hydraulic actuators 26 include the same components discussed below for hydraulic actuator 20. The only difference between hydraulic actuators 20 and 26 may be the way in which the hydraulic actuator is attached to the sprung and/or unsprung portion of the vehicle.

Referring to FIG. 2, hydraulic actuator 20 comprises a control system 30 and a shock absorber 32. Control system 30 comprises a pair of inlet valves 34 and 36, a pair of valves 38 and 40 which control fluid flow and/or pressure, a motor/pump 42, a flow controller 44 and an accumulator 46. Flow controller 44 can be a single valve assembly, multiple valve assemblies or any other device or devices that control fluid flow. These components 30-46 are fluidically connected with each other as illustrated in FIGS. 2-6 by a plurality of fluid lines 48.

Shock absorber 32 comprises a pressure tube 50 having a fluid chamber 52 that is divided into an upper working chamber 54 having a flow port 54a, and a lower working chamber 56 having a lower flow port 56a, by a piston assembly 58. Piston assembly 58 is slidingly received within pressure tube 50 and piston assembly 58 includes a piston rod 60 that extends through upper working chamber 54 and is attached to the sprung portion of vehicle 10. Pressure tube 50 is attached to the unsprung portion of vehicle 10. Piston assembly 58 can also include a pair of optional blow-off valves 62 and 64. Blow-off valves 62 and 64 define the upper limit of pressure drop over piston assembly 58 during a compression stroke and a rebound stroke, respectively, of shock absorber 32. Blow-off valves 62 and 64 limit the maximum pressures and thus the maximum forces in shock absorber 32. This protects the shock absorber and the vehicle from damage and it improves the comfort on potholes. During the normal operation of shock absorber 32, blow-off valves 62 and 64 remain closed and the pressures above and below piston assembly are controlled by valves 38 and 40 as described below.

The pressures above and below piston assembly generated by the rebound stroking and compression stroking of shock absorber 32 define the force that shock absorber 32 is generating. Valves 38 and 40 are fast switching adaptive valves which can generate a wide range of flow and/or pressure drops for any given flow rate, and are in direct communication with the flow ports 54a and 56a, respectively. Because of motor/pump 42 and flow controller 44, the flows through valves 38 and 40 are not dependent on the velocity of piston assembly 58 in pressure tube 50. This allows damping forces to be generated not only in the semi-active quadrants of shock absorbers 32 force vs. velocity graphs but also in the active quadrants.

Figure 3:
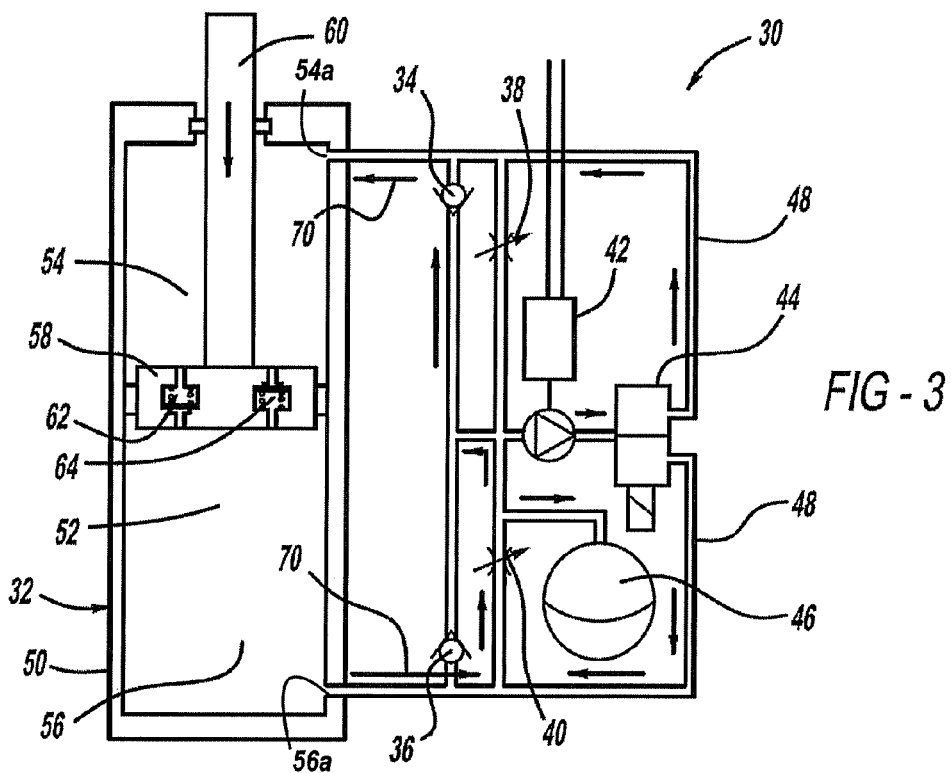
FIG. 3 is a schematic view of the hydraulic actuator illustrated in FIG. 2 showing fluid flow during a semi-active compression mode of the hydraulic actuator.

Referring to FIG. 3, fluid flow in a semi-active compression mode for shock absorber 32 is illustrated. When piston assembly 58 moves in the compression direction (downward in FIG. 3) at a given velocity, a variable semi-active compression force can be generated by creating a pressure drop over valve 38. As piston assembly 58 is pushing damping fluid out of lower working chamber 56, fluid flows into valve 40. Simultaneously, damping fluid is sucked into upper working chamber 54 through inlet valve 34. The rod volume flow of fluid flows into accumulator 46. The pressure in upper working chamber 54 will be the same or slightly less than the pressure in accumulator 46. In this case, damping fluid flow from motor/pump 42 can either be directed by flow controller 44 towards upper working chamber 54 where the damping pressure is low to increase the pressure in upper working chamber 54 and optimize energy consumption, or directed by flow controller 44 towards lower working chamber 56 in order to achieve even higher pressures in lower working chamber 56. These flows are illustrated by arrows 70 in FIG. 3.

Figure 4:
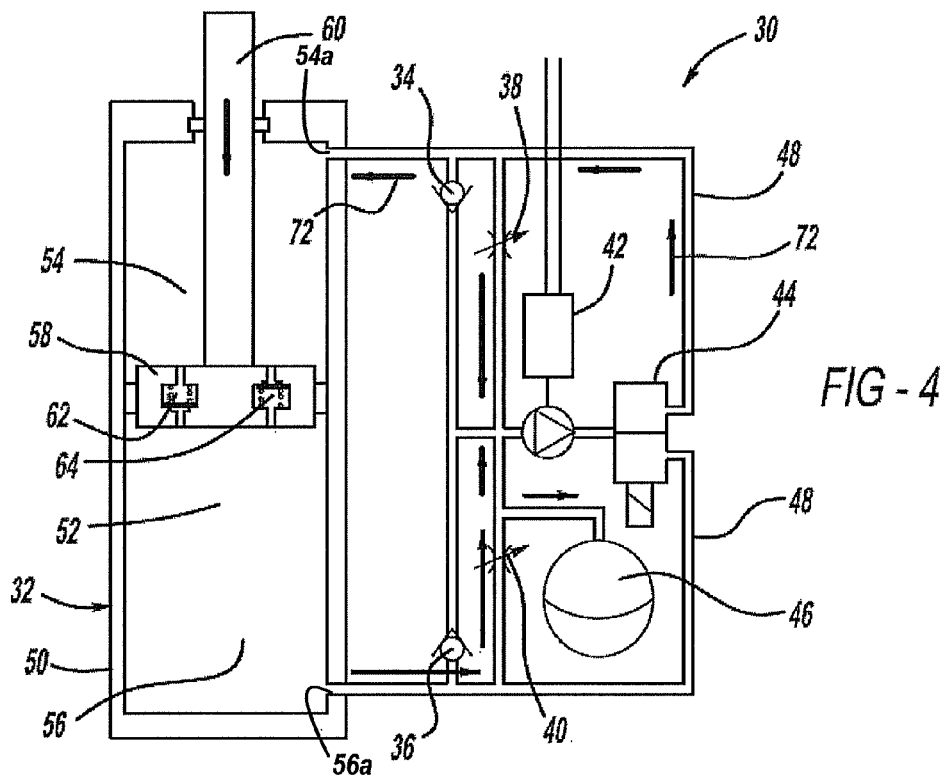
FIG. 4 is a schematic view of the hydraulic actuator illustrated in FIG. 2 showing fluid flow during an active compression operation mode.

Referring to FIG. 4, fluid flow in an active compression mode for shock absorber 32 is illustrated. When piston assembly 58 moves in the compression direction (downward in FIG. 4) at a given velocity, a variable active rebound force can be generated. This means that shock absorber 32 and rear suspension 12 are actively pushed into compression by the system itself. To achieve this, a pressure drop must be maintained over valve 38 as piston assembly 58 is sucking damping fluid into upper working chamber 54. This is achieved by directing damping fluid flow through flow controller 44 from motor/pump 42 into upper working chamber 54. As long as the damping fluid flow from motor/pump 42 is higher than the flow of damping fluid sucked into upper working chamber 54, the remaining pumped damping flow will be pushed through valve 38 which can then control the pressure in upper working chamber 54. Simultaneously, damping fluid is pushed out of lower working chamber 56, through valve 40 and into motor/pump 42 and accumulator 46. In order to optimize energy consumption, valve 40 should be controlled to be fully opened such that the pressure drop across valve 40 is minimal. This will ensure that the pressure in lower working chamber 56 remains as low as possible. These flows are illustrated by arrows 72 in FIG. 4.

If there is no movement of piston assembly 58, either active compression forces or active rebound forces can be generated by directing damping fluid from motor/pump 42 to either upper working chamber 54 or lower working chamber 56 to compensate for static body roll while cornering for example. Also, by turning motor/pump 42 off and closing flow controller 44, the damping forces for shock absorber 32 can be controlled by one or both of valves 38 and 40.

Figure 5:
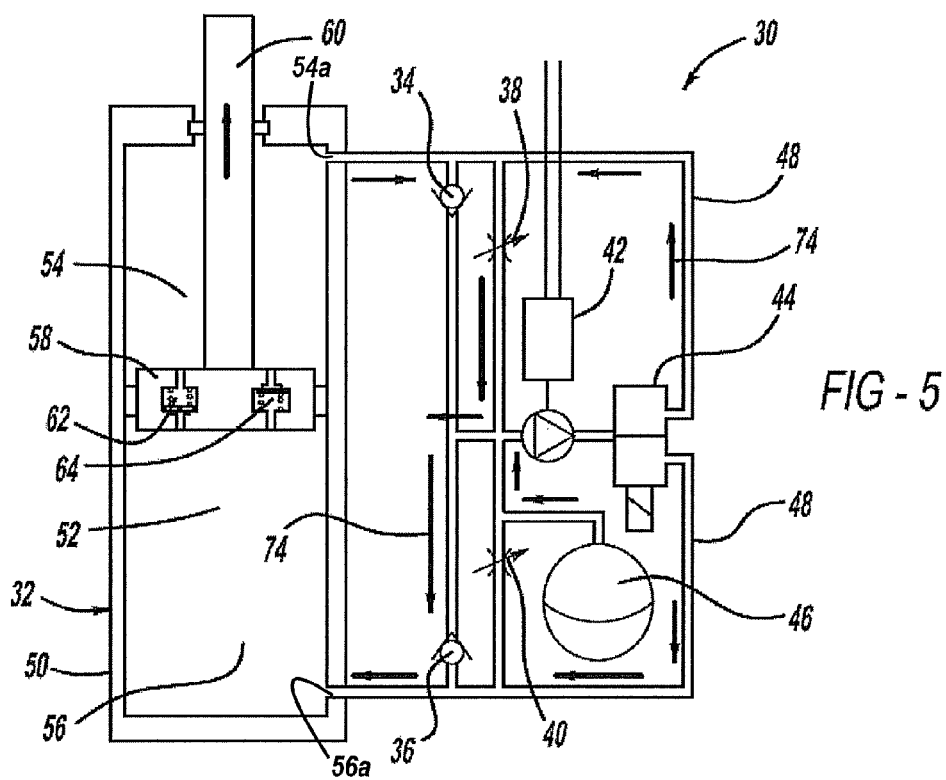
FIG. 5 is a schematic view of the hydraulic actuator illustrated in FIG. 2 showing fluid flow during a semi-active rebound mode of the hydraulic actuator.

Referring to FIG. 5, fluid flow in a semi-active rebound mode for shock absorber 32 is illustrated. When piston assembly 58 moves in the rebound direction (upward in FIG. 3) at a given velocity, a variable semi-active rebound force can be generated by creating a pressure drop over valve 38. As piston assembly 58 is pushing damping fluid out of upper working chamber 54, fluid flows into valve 38. Simultaneously, damping fluid is sucked into lower working chamber 56 through inlet valve 36 from accumulator 46. The pressure in lower working chamber 56 will be the same or slightly less than the pressure in accumulator 46. In this case, damping fluid flow from motor/pump 42 can either be directed by flow controller 44 towards lower working chamber 56 where the damping pressure is low to increase the fluid pressure in lower working chamber 56 and optimize energy consumption, or directed by flow controller 44 toward upper working chamber 54 in order to achieve even higher pressures in upper working chamber 54. These flows are illustrated by arrows 74 in FIG. 5.

Figure 6:
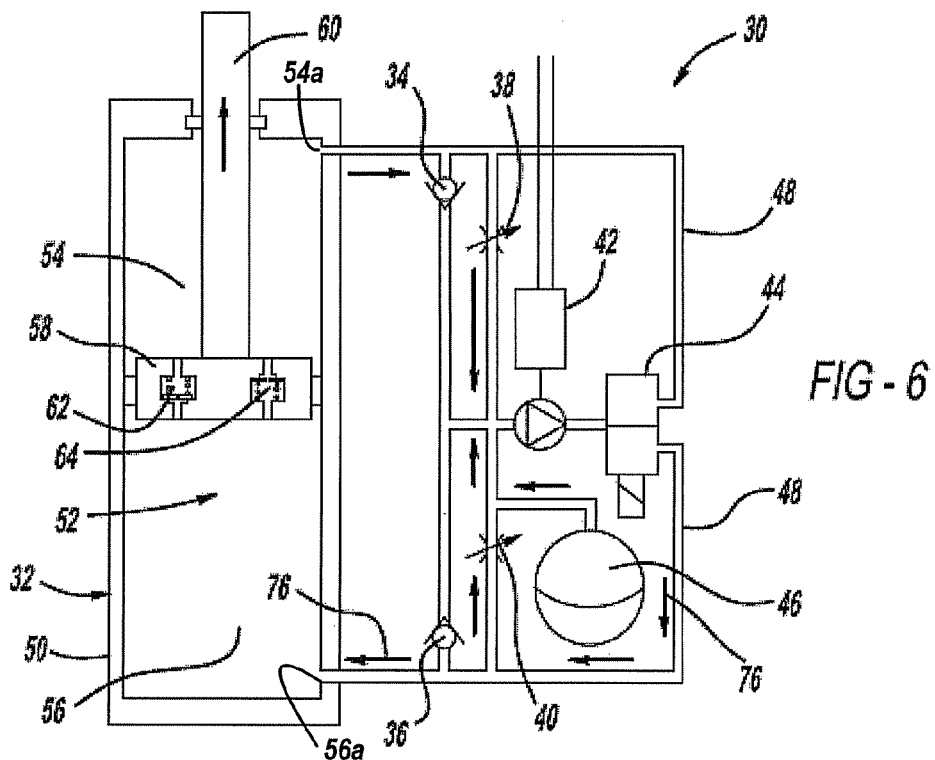
FIG. 6 is a schematic view of the hydraulic actuator illustrated in FIG. 2 showing fluid flow during an active rebound operation mode.

Referring to FIG. 6, fluid flow in an active rebound mode for shock absorber 32 is illustrated. When piston assembly 58 moves in the rebound direction (upward in FIG. 4) at a given velocity, a variable active compression force can be generated. This means that shock absorber 32 and rear suspension 12 are actively pushed into rebound by the system itself. To achieve this, a pressure drop must be maintained over valve 40 as piston assembly 58 is sucking damping fluid into lower working chamber 56. This is achieved by directing damping fluid flow through flow controller 44 from motor/pump 42 into lower working chamber 56. As long as the damping fluid flow from motor/pump 42 is higher than the flow of damping fluid sucked into lower working chamber 56, the remaining pumped damping flow will be pushed through valve 40 which can then control the pressure in lower working chamber 56. Simultaneously, damping fluid is pushed out of upper working chamber 54, through valve 38 and into motor/pump 42. In order to optimize energy consumption, valve 38 should be controlled to be fully opened such that the pressure drop across valve 38 is minimal. This will ensure that the pressure in upper working chamber 54 remains as low as possible. Fluid flow from accumulator 46 will be directed towards motor/pump 42. These flows are illustrated by arrows 76 in FIG. 6.

Figure 7:
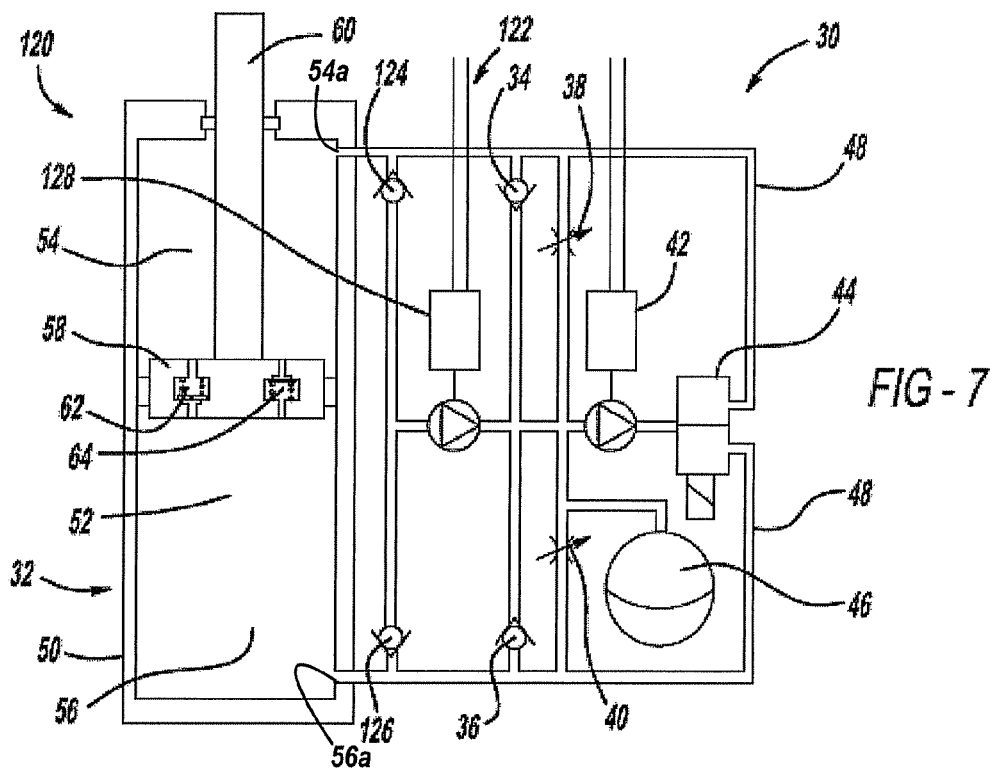
FIG. 7 is a schematic view of a hydraulic actuator in accordance with another embodiment of the present disclosure which incorporates an energy recuperating system.

Referring now to FIG. 7, a hydraulic actuator 120 in accordance with another embodiment of the present disclosure is illustrated. Hydraulic actuator 120 comprises shock absorber 32, control system 30 which includes the pair of inlet valves 34 and 36, the pair of valves 38 and 40, motor/pump 42, flow controller 44 and accumulator 46. Thus, hydraulic actuator 120 is the same as hydraulic actuator 20 except that hydraulic actuator 120 includes an optional energy recuperation device 122. Energy recuperation device 122 comprises a pair of intake valves 124 and 126, and a turbine/generator 128. Turbine/generator 128 receives damping fluid from upper working chamber 54 or lower working chamber 56 through intake valves 124 and 126. Intake valves 124 and 126 are positioned such that damping fluid will flow from upper working chamber 54 or lower working chamber 56 depending on which working chamber 54, 56 is at the highest pressure. In this way, both valves 38 and 40 can be bypassed by the flow of damping fluid through energy recuperation device 122. Thus, energy can be recuperated in the form of electric power depending on the control of energy recuperating device 122.

Figure 8:
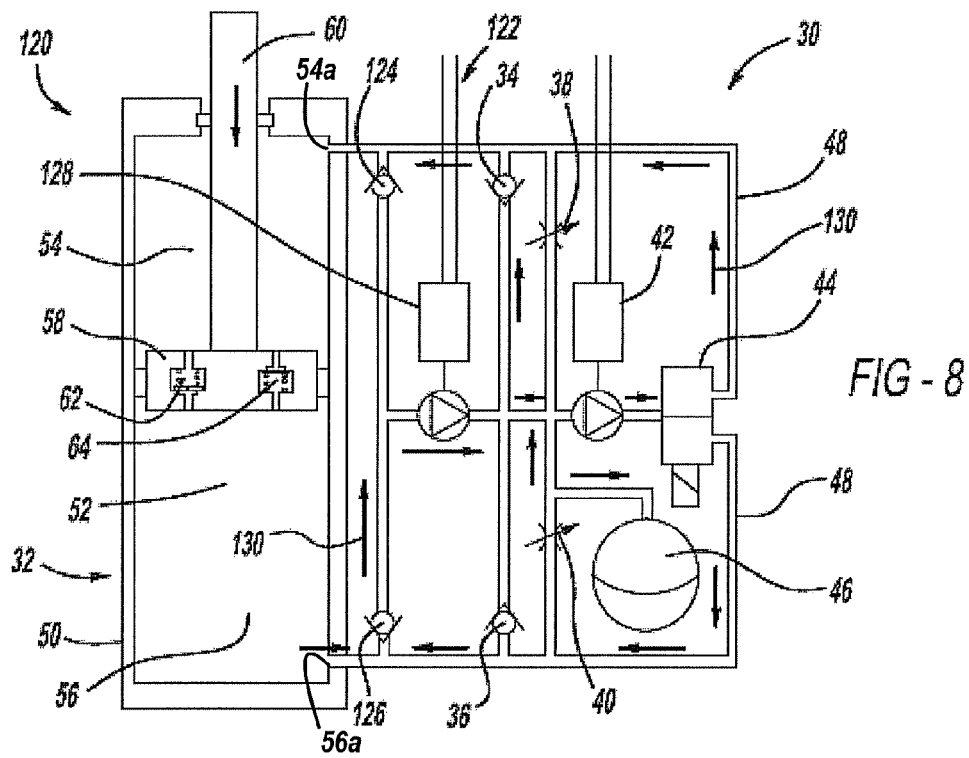
FIG. 8 is a schematic view of the hydraulic actuator illustrated in FIG. 7 showing fluid flow during a semi-active compression mode of the hydraulic actuator.

Referring to FIG. 8, fluid flow in a semi-active compression mode for shock absorber 32 is illustrated. When piston assembly 58 moves in the compression direction (downward in FIG. 8) at a given velocity, a variable semi-active compression force can be generated by creating a pressure drop over turbine/generator 128. As piston assembly 58 is pushing damping fluid out of lower working chamber 56, fluid flows through intake valve 126 into turbine/generator 128. Simultaneously, damping fluid is sucked into upper working chamber 54 through inlet valve 34. The rod volume flow of fluid flows into accumulator 46. The pressure in upper working chamber 54 will be the same or slightly less than the pressure in accumulator 46. In this case, damping fluid flow from motor/pump 42 can either be directed by flow controller 44 towards upper working chamber 54 where the damping pressure is low to increase the pressure in upper working chamber 54 and optimize energy consumption, or directed by flow controller 44 towards lower working chamber 56 in order to achieve even higher pressures in lower working chamber 56. These flows are illustrated by arrows 130 in FIG. 8. Fluid flow through turbine/generator 128 will generate electrical energy.

Figure 9:
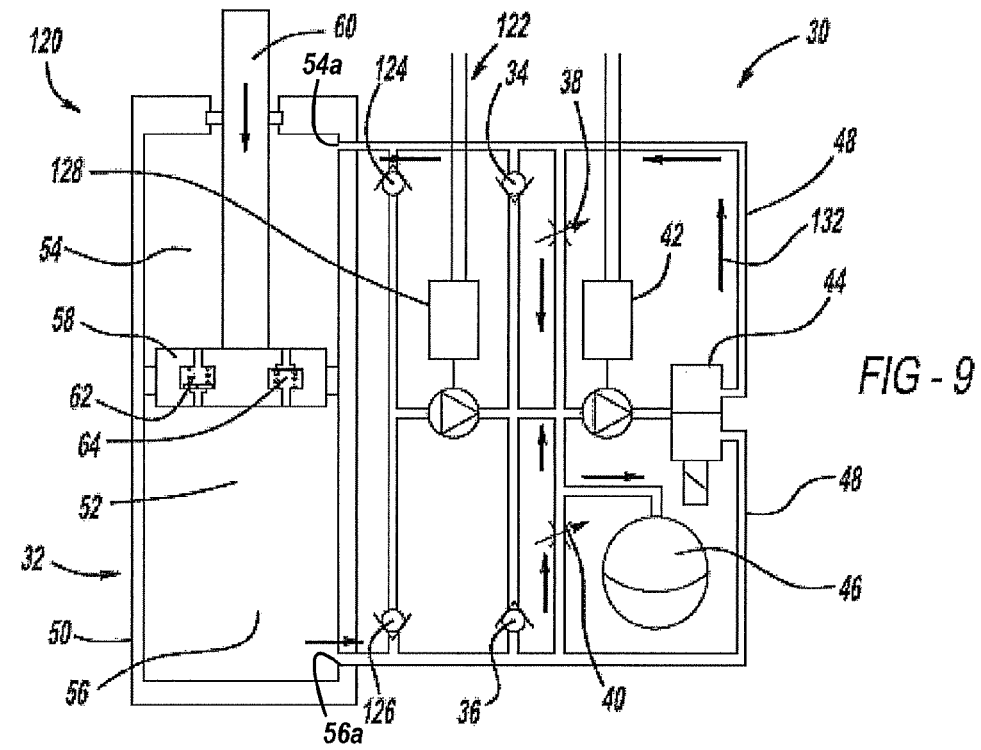
FIG. 9 is a schematic view of the hydraulic actuator illustrated in FIG. 7 showing fluid flow during an active compression operation mode.

Referring to FIG. 9, fluid flow in an active compression mode for shock absorber 32 is illustrated. When piston assembly 58 moves in the compression direction (downward in FIG. 9) at a given velocity, a variable active rebound force can be generated. This means that shock absorber 32 and rear suspension 12 are actively pushed into compression by the system itself. To achieve this, a pressure drop must be maintained over valve 38 as piston assembly 58 is sucking damping fluid into upper working chamber 54. This is achieved by directing damping fluid flow through flow controller 44 from motor/pump 42 into upper working chamber 54. As long as the damping fluid flow from motor/pump 42 is higher than the flow of damping fluid sucked into upper working chamber 54, the remaining pumped damping flow will be pushed through valve 38 which can then control the pressure in upper working chamber 54. Simultaneously, damping fluid is pushed out of lower working chamber 56, through valve 40 and into accumulator 46. In order to optimize energy consumption, valve 40 should be controlled to be fully opened such that the pressure drop across valve 40 is minimal. This will ensure that the pressure in lower working chamber 56 remains as low as possible. These flows are illustrated by arrows 132 in FIG. 9.

If there is no movement of piston assembly 58, either active compression forces or active rebound forces can be generated by directing damping fluid from motor/pump 42 to either upper working chamber 54 or lower working chamber 56 to compensate for static body roll while cornering for example. Also, by turning motor/pump 42 off and closing flow controller 44, the damping forces for shock absorber 32 can be controlled by one or both of valves 38 and 40.

Figure 10:
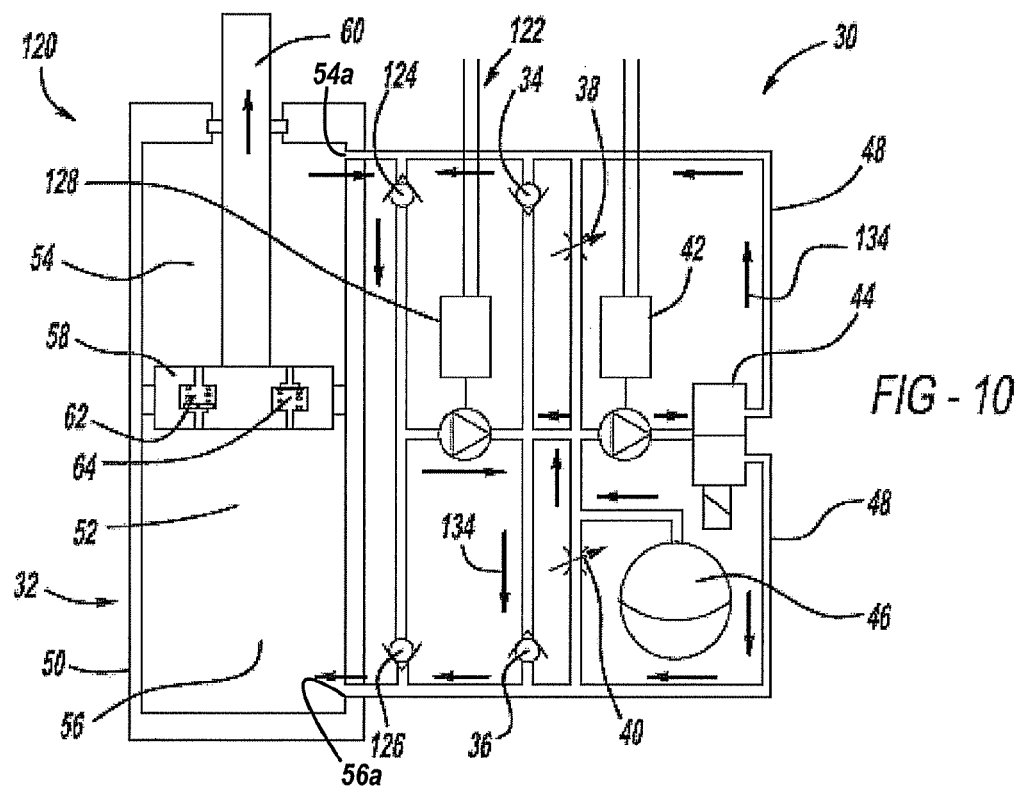
FIG. 10 is a schematic view of the hydraulic actuator illustrated in FIG. 7 showing fluid flow during a semi-active rebound mode of the hydraulic actuator.

Referring to FIG. 10, fluid flow in a semi-active rebound mode for shock absorber 32 is illustrated. When piston assembly 58 moves in the rebound direction (upward in FIG. 10) at a given velocity, a variable semi-active rebound force can be generated by creating a pressure drop over turbine/generator 128. As piston assembly 58 is pushing damping fluid out of upper working chamber 54, fluid flows into turbine/generator 128. Simultaneously, damping fluid is sucked into lower working chamber 56 through inlet valve 36 from accumulator 46 and turbine/generator 128. The pressure in lower working chamber 56 will be the same or slightly less than the pressure in accumulator 46. In this case, damping fluid flow from motor/pump 42 can either be directed by flow controller 44 towards lower working chamber 56 where the damping pressure is low to increase the fluid pressure in lower working chamber 56 and optimize energy consumption, or directed by flow controller 44 toward upper working chamber 54 in order to achieve even higher pressures in upper working chamber 54. These flows are illustrated by arrows 134 in FIG. 10. Fluid flow through turbine/generator 128 will generate electrical energy.

Figure 11:
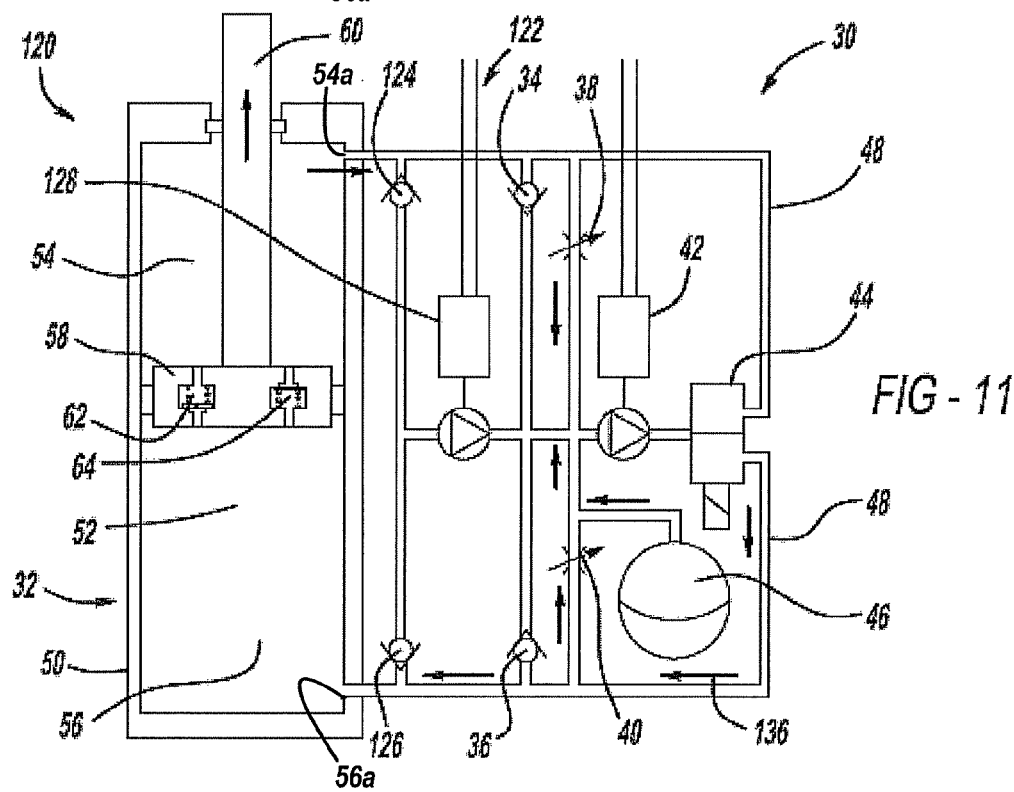
FIG. 11 is a schematic view of the hydraulic actuator illustrated in FIG. 7 showing fluid flow during an active rebound operation mode.

Referring to FIG. 11, fluid flow in an active rebound mode for shock absorber 32 is illustrated. When piston assembly 58 moves in the rebound direction (upward in FIG. 11) at a given velocity, a variable active compression force can be generated. This means that shock absorber 32 and rear suspension 12 are actively pushed into rebound by the system itself. To achieve this, a pressure drop must be maintained over valve 40 as piston assembly 58 is sucking damping fluid into lower working chamber 56. This is achieved by directing damping fluid flow through flow controller 44 from motor/pump 42 into lower working chamber 56. As long as the damping fluid flow from motor/pump 42 is higher than the flow of damping fluid sucked into lower working chamber 56, the remaining pumped damping flow will be pushed through valve 40 which can then control the pressure in lower working chamber 56. Simultaneously, damping fluid is pushed out of upper working chamber 54, through valve 38 and into motor/pump 42. In order to optimize energy consumption, valve 38 should be controlled to be fully open such that the pressure drop across valve 38 is minimal. This will ensure that the pressure in upper working chamber 54 remains as low as possible. Fluid flow from accumulator 46 will be directed towards motor/pump 42. These flows are illustrated by arrows 136 in FIG. 11.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hydraulic actuator comprising:
a pressure tube defining a fluid chamber;
a piston slidably disposed within said pressure tube, said piston dividing said fluid chamber into an upper working chamber and a lower working chamber;
said upper working chamber having an upper flow port and said lower working chamber having a lower flow port;
a control system disposed outside of said fluid chamber generating damping forces for said hydraulic actuator, said control system being in direct fluid communication with said upper and lower working chambers; and
said control system including a flow controller, a first adaptive valve in direct fluid communication with said upper flow port of said upper working chamber, and a second adaptive valve in direct fluid communication with said lower flow port of said lower working chamber, said first and second adaptive valves configured to enable a range of flows and pressure drops for different flow rates, to thus enable an active damping force to be generated by said control system; and
said flow controller in fluid communication with a motor/pump, said upper working chamber and said lower working chamber, and further being in direct flow communication with said upper and lower working chambers.

2. The hydraulic actuator according to claim 1, wherein said control system comprises:
a first plurality of check valves in fluid communication with said upper and lower flow ports of said upper and lower working chambers; and
said motor/pump in fluid communication with said first and second adaptive valves.

3. The hydraulic actuator according to claim 2, further comprising an accumulator in fluid communication with said motor/pump; and
wherein the accumulator is further in direct flow communication with both of the first and second adaptive valves.

4. The hydraulic actuator according to claim 2, wherein said first plurality of check valves are disposed between said upper and lower working chambers, a first one of said first plurality of check valves prohibiting fluid flow from said upper working chamber to said lower working chamber, a second one of said first plurality of check valves prohibiting fluid flow from said lower working chamber to said upper working chamber.

5. The hydraulic actuator according to claim 2, further comprising an energy recuperating device in fluid communication with said upper and lower working chambers.

6. The hydraulic actuator according to claim 5, wherein said energy recuperating device comprises:
a second plurality of check valves in fluid communication with said upper and lower working chambers; and
a turbine/generator in direct fluid communication with said first plurality of check valves and said second plurality of check valves.

7. The hydraulic actuator according to claim 1, further comprising an accumulator in fluid communication with said motor/pump.

8. The hydraulic actuator according to claim 1, further comprising an energy recuperating device in fluid communication with said upper and lower working chambers.

9. The hydraulic actuator according to claim 8, wherein said energy recuperating device comprises:
a second plurality of check valves in fluid communication with said upper and lower working chambers; and
a turbine/generator in direct fluid communication with said first plurality of check valves and said second plurality of check valves.

10. The hydraulic actuator according to claim 9, wherein said turbine/generator is in fluid communication with said accumulator and with said motor/pump.

11. The hydraulic actuator according to claim 8, wherein said energy recuperation device comprises:
a plurality of check valves in fluid communication with said upper and lower working chambers; and
a turbine/generator in direct fluid communication with said plurality of check valves and said control system.

12. The hydraulic actuator according to claim 11, wherein said plurality of check valves are disposed between said upper and lower working chambers, a first one of said plurality of check valves prohibiting fluid flow from said upper working chamber to said lower working chamber, a second one of said plurality of check valves prohibiting fluid flow from said lower working chamber to said upper working chamber.

* * * * *